W. J. BALDWIN.
APPARATUS FOR SEPARATING FOREIGN MATERIALS FROM GASES.
APPLICATION FILED MAY 18, 1917.
1,292,561.
Patented Jan. 28, 1919.
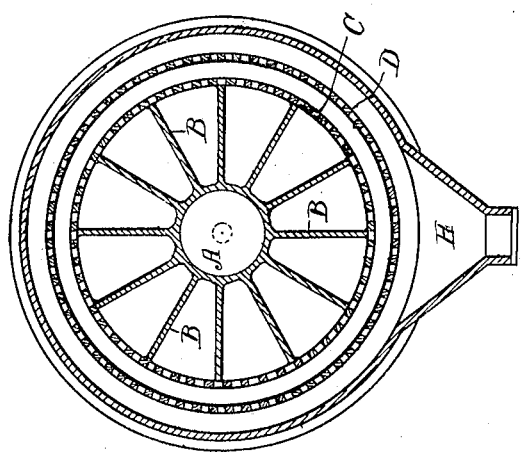
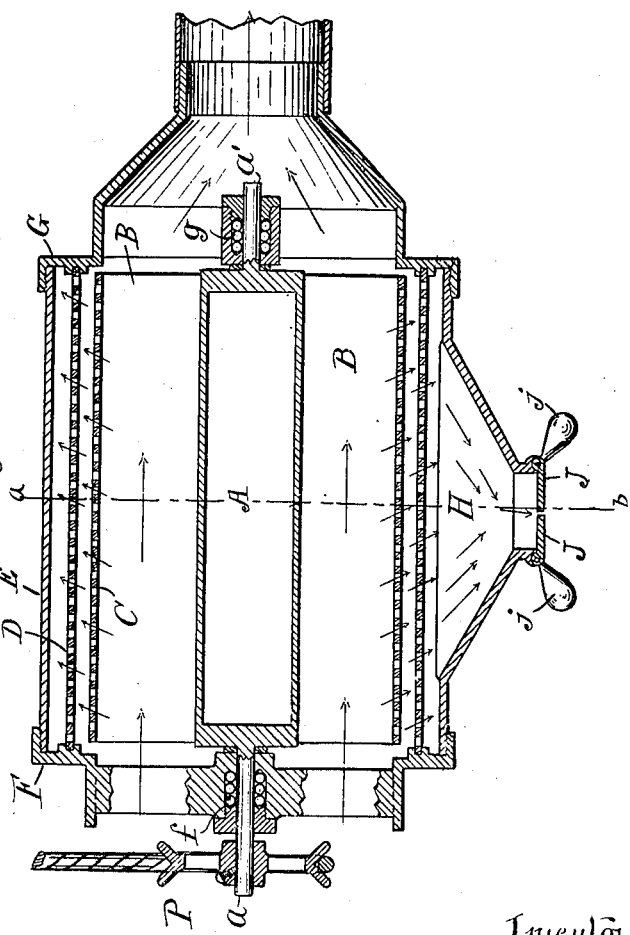

UNITED STATES PATENT OFFICE.

WILLIAM J. BALDWIN, OF BROOKLYN, NEW YORK.

APPARATUS FOR SEPARATING FOREIGN MATERIALS FROM GASES.

1,292,561. Specification of Letters Patent. Patented Jan. 28, 1919.

Application filed May 18, 1917. Serial No. 169,411.

*To all whom it may concern:*

Be it known that I, WILLIAM J. BALDWIN, a citizen of the United States, and a resident of the borough of Brooklyn, in the county of Kings and State of New York, have invented certain new and useful Improvements in Apparatus for Separating Foreign Materials from Gases, of which the following is a specification.

This invention relates to improvements in apparatus for separating foreign materials from gases; and the invention applies as well to the separation of a gas, including air, from solid particles such as dust or smoke, and separating gases from liquids or fluids.

The invention broadly considered covers the combination, with a revolving perforated screen, through the sizable perforations of which the particles of the material to be separated (or which are of the greater specific gravity) are to be thrown out of the gas, of a stationary screen also having sizable perforations and arranged outside of the said revolving screen, and an imperforate case outside said stationary screen, and within which the said screens are located. Said case is normally so closed that there is a practically quiet air space between said stationary screen and said case.

Broadly explained, the operation of the invention is as follows: The gas containing the foreign matters is put into rapid rotation within said revolving screen by blades or any suitable device, and is also propelled lengthwise of said screen, the inlet and outlet ends of which are provided with suitable openings. The said rapid rotation of the gas forces the foreign materials outward and tangentially around said revolving screen, until the foreign materials fly outward through the perforations of the said revolving screen, and into the annular space between the two screens. Across this space also the foreign materials are outwardly thrown by the centrifugal force of their revolution, which is maintained in great degree by the friction with the said revolving screen; and therefore said foreign materials are finally thrown out through the perforations of the stationary screen into the said quiet space between said stationary screen and said case. Said stationary screen greatly reduces, or practically wholly overcomes, the tangential motion, or revolution, of said foreign matters, which therefore drop down within and through said quiet air space to a receptacle from which they can be readily removed.

In accomplishing the aforesaid separation of the foreign materials from the gas, a very important element, especially in apparatus of small size, is the stationary screen, in its combination with the revolving screen and the outer stationary case; because it prevents the clinging of the said foreign materials against and on the said casing. Without said stationary screen the foreign matters will so temporarily cling to the casing, because of the whirling or centrifugal motion, as to diminish the efficiency of the apparatus, by retaining the separated particles against the walls; but with said stationary screen, the said foreign materials do not cling to said casing, but fall freely through said quiet space, to the receptacle from which they are readily removed, and the separating efficiency of the apparatus becomes higher and permits the use of a smaller casing without lowering the efficiency of the apparatus.

Now referring to the drawings which accompany the specification, to aid the description, and which illustrate apparatus adapted for location in the induction pipe of a gasolene engine, Figure 1 is a longitudinal section of the apparatus, and Fig. 2 is a cross section thereof on the plane of the section line *a b* of Fig. 1.

On a drum, or hub, A, mounted to revolve and preferably in ball bearings, are fixed radial blades B, on the outer ends of which is secured the perforated cylindrical screen C having open ends. Said drum, blades and screen are revolved in any suitable manner, as by a belt and pulley P, from any motor.

A stationary perforated screen D, preferably concentric with said screen C, and located a short distance outside of the latter, is suitably secured in a stationary casing E, the body of which is preferably cylindrical and located a short distance outside of and concentric with said stationary screen D. The heads F—G of said casing E have central openings; that in the inlet end being preferably as large as the said revolving screen C, and the opening in the outlet end being preferably contracted; and the spiders, on which the said ball bearings $f$—$g$ are respectively secured, being fastened to said heads.

The lower part of said casing E is preferably provided with a hopper H, or receptacle for the foreign separated materials, and equipped with valves J operated in any manner, as by handles $j$—$j$.

The flow of the gas longitudinally from end to end of said screen C, can be produced by a suitable blowing or suction fan, or by the suction of the chimney or other devices with which said invention is used, and the said outlet may deliver the gas, after the foreign material has been separated, to any desired place, as into a chimney, engine exhaust pipe, settling chamber or any other desired place. And the separated foreign materials may also be removed and treated in any desired manner.

The operation will be plain from the foregoing description and explanation. The gas, with the foreign material which is to be separated from it, is induced to flow longitudinally through the said perforated screen C, and is given rapid revolution by said blades B. The centrifugal force imparted by this revolution to the material to be separated forces said material outwardly and out through the perforations of said screen C; the rapid revolution of said screen maintaining up to this point the rapid rotation of said material; which, therefore, by the centrifugal force of said rotation, flies outwardly across the space between said revolving screen C and said stationary screen D, and is finally rubbed outwardly through the perforations in said screen and into the quiet air space between said screen and said casing E. But said screen D being stationary, as the material to be separated passes through the perforations therein, the rotary velocity of said material is practically destroyed, and therefore, as said material passes into said quiet space with practically no rotary motion, said material falls freely down into said receptacle H, while the gas from which said material has been separated, (and into which the said screens prevent said material again mixing) flows longitudinally through said screen C and to the place of use.

The ends of said blades B and said screen C are separated a little from said heads F—G to prevent injurious friction, and also to make a small annular aperture for the flow of any gas freed from foreign material from the space between the two screens into the outlet for the separated gas.

It will be understood that, in the normal operation of the apparatus, there is practically no escape for air or gas from said casing E, and, therefore, very soon after the screen C begins to revolve there will be practically as great a gaseous pressure outside of said screens C—D as there is inside said screen C; and consequently the gas from which the foreign material is to be separated does not fly outwardly through said screen C, but remains in said screen C and flows to the outlet as described, while the heavier foreign material does fly out of said screen C and finally into the quiet space between said stationary screen D and casing E as also herein described.

Said screens C—D are of any suitable material, as perforated sheet metal, wire mesh, or other material, and the perforations therein will be sufficiently large to permit of agglomerates of small masses of the foreign material to fly readily outward through said perforations, while the practical equality of the air or gaseous pressure within and without said screens prevent the gas from which the foreign material is to be removed from flowing normally out through the said screens.

Now having described my improvements, I claim as my invention.

1. In apparatus for separating gas and heavier materials, and in combination with a revoluble screen open from end to end for the flow of gas longitudinally through the screen and said screen having relatively large perforations for the escape of the heavier materials, a stationary perforated screen arranged outside of said revoluble screen, substantially as described.

2. The combination in a centrifugal separating apparatus, for the separation of gas and heavier materials, of a revoluble screen open from end to end for the flow of gas longitudinally through the interior of the screen, and said screen being provided with relatively large sized perforations for the escape outwardly from said screen of the heavier materials, and a stationary screen arranged around outside of said revoluble screen and having relatively large sized perforations for the escape outwardly through said stationary screen of said heavier materials, substantially as described.

3. In apparatus for the centrifugal separation of gas and heavier materials, the combination of a rotatable screen open from end to end for the passage of gas longitudinally through said screen, and the wall of said screen having relatively large perforations to admit of the escape outwardly from said screen of said heavier materials, means for producing a flow of mixed materials and gas through said apparatus, a stationary screen arranged outside of said rotatable screen and having relatively large perforations to admit of the escape outwardly of said heavier materials from said stationary screen, and a casing around outside of said stationary screen and at an appreciable distance outside of said stationary screen, substantially as described.

Signed at New York city in the county of New York and State of New York this 16th day of May, A. D. 1917.

WILLIAM J. BALDWIN.

Witnesses:
 WILLIAM PATTERSON,
 WALTER N. HARRIS.